United States Patent
Kasazumi et al.

(10) Patent No.: US 10,222,625 B2
(45) Date of Patent: Mar. 5, 2019

(54) DISPLAY DEVICE

(71) Applicant: Panasonic Intellectual Property Management Co., Ltd., Osaka (JP)

(72) Inventors: Kenichi Kasazumi, Osaka (JP); Toshiya Mori, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 113 days.

(21) Appl. No.: 15/307,324

(22) PCT Filed: May 8, 2015

(86) PCT No.: PCT/JP2015/002336
§ 371 (c)(1),
(2) Date: Oct. 27, 2016

(87) PCT Pub. No.: WO2015/174049
PCT Pub. Date: Nov. 19, 2015

(65) Prior Publication Data
US 2017/0168309 A1    Jun. 15, 2017

(30) Foreign Application Priority Data
May 12, 2014 (JP) .................... 2014-098804

(51) Int. Cl.
*H04N 7/18* (2006.01)
*G02B 27/22* (2018.01)
(Continued)

(52) U.S. Cl.
CPC ............ *G02B 27/2214* (2013.01); *B60J 1/02* (2013.01); *B60K 35/00* (2013.01);
(Continued)

(58) Field of Classification Search
CPC ............ G02B 27/2214; G02B 27/0101; G02B 27/0093; G02B 27/22; G02B 27/01;
(Continued)

(56) References Cited

U.S. PATENT DOCUMENTS

2011/0187832 A1* 8/2011 Yoshida .................. A63F 13/02
348/46
2012/0044330 A1* 2/2012 Watanabe .......... G02B 27/2214
348/54
(Continued)

FOREIGN PATENT DOCUMENTS

GB    2405043 A    2/2005
JP    7-105485 A   4/1995
(Continued)

OTHER PUBLICATIONS

The Extended European Search Report dated May 12, 2017 for the related European Patent Application No. 15793618.8.
(Continued)

*Primary Examiner* — Allen C Wong
(74) *Attorney, Agent, or Firm* — Greenblum & Bernstein, P.L.C.

(57) ABSTRACT

A display device includes a video element and a parallax optical element. The video element projects, onto a windshield, a stereoscopic vision image in which a plurality of rectangular left-eye images and a plurality of rectangular right-eye images are alternately arrayed in a first array pattern. The parallax optical element is provided between the video element and the windshield and includes a plurality of separation parts arrayed in a lattice-like fashion and in a second array pattern; the separation parts separating the stereoscopic vision image into the left-eye images and the right-eye images. At least one of the first array pattern and
(Continued)

the second array pattern is a nonuniform array pattern that conforms to a curved surface of the windshield.

7 Claims, 7 Drawing Sheets

(51) Int. Cl.
| | |
|---|---|
| *H04N 13/139* | (2018.01) |
| *H04N 13/144* | (2018.01) |
| *H04N 13/315* | (2018.01) |
| *H04N 13/383* | (2018.01) |
| *B60K 35/00* | (2006.01) |
| *B60J 1/02* | (2006.01) |
| *G02B 27/01* | (2006.01) |
| *G09G 5/00* | (2006.01) |
| *G09G 5/36* | (2006.01) |
| *G02B 27/00* | (2006.01) |
| *H04N 13/30* | (2018.01) |

(52) U.S. Cl.
CPC ......... *G02B 27/0093* (2013.01); *G02B 27/01* (2013.01); *G02B 27/0101* (2013.01); *G02B 27/22* (2013.01); *G09G 5/00* (2013.01); *G09G 5/36* (2013.01); *H04N 13/139* (2018.05); *H04N 13/144* (2018.05); *H04N 13/30* (2018.05); *H04N 13/315* (2018.05); *H04N 13/383* (2018.05); *B60K 2350/2017* (2013.01); *B60K 2350/2052* (2013.01); *G02B 2027/011* (2013.01); *G02B 2027/013* (2013.01); *G02B 2027/014* (2013.01); *G02B 2027/0129* (2013.01); *G02B 2027/0134* (2013.01); *G02B 2027/0187* (2013.01)

(58) Field of Classification Search
CPC ...... G02B 2027/013; G02B 2027/0129; G02B 2027/011; G02B 2027/014; G02B 2027/0134; G02B 2027/0187; H04N 13/0484; H04N 13/0033; H04N 13/0413; H04N 13/0029; H04N 13/04; B60K 35/00; B60K 2350/2052; B60K 2350/2017; B60J 1/02; G09G 5/36; G09G 5/00
USPC .......................................................... 348/115
See application file for complete search history.

(56) References Cited

U.S. PATENT DOCUMENTS

| | | | |
|---|---|---|---|
| 2013/0069933 A1* | 3/2013 | Smithwick | ......... G02B 27/2214 345/419 |
| 2014/0078268 A1 | 3/2014 | Watanabe et al. | |

FOREIGN PATENT DOCUMENTS

| | | |
|---|---|---|
| JP | 2005-062867 A | 3/2005 |
| JP | 2011-090076 | 5/2011 |
| JP | 2014-068331 A | 4/2014 |
| WO | 2012/176443 A1 | 12/2012 |

OTHER PUBLICATIONS

International Search Report of PCT application No. PCT/JP2015/002336 dated Jul. 21, 2015.

\* cited by examiner

DISPLAY DEVICE

CROSS-REFERENCE TO RELATED APPLICATIONS

This application is a U.S. national stage application of the PCT International Application No. PCT/JP2015/002336 filed on May 8, 2015, which claims the benefit of foreign priority of Japanese patent application No. 2014-098804 filed on May 12, 2014, the contents all of which are incorporated herein by reference.

TECHNICAL FIELD

The present disclosure relates to a display device and more particularly to a display device for a vehicle.

BACKGROUND ART

A head-up display (HUD) is known as a display device for a vehicle (e.g., refer to PTL 1). An exemplary head-up display displays an object that indicates a state of the vehicle (e.g., speed meter) and an object for navigating the vehicle.

CITATION LIST

Patent Literature

PTL 1: Unexamined Japanese Patent Publication No. 2011-090076

SUMMARY OF THE INVENTION

The present disclosure provides a display device that is capable of suppressing crosstalk in naked eye stereoscopic vision.

A display device according to an aspect of the present disclosure includes a video element and a parallax optical element. The video element projects, onto a windshield, a stereoscopic vision image in which a plurality of rectangular left-eye images and a plurality of rectangular right-eye images are alternately arrayed in a first array pattern. The parallax optical element is provided between the video element and the windshield and includes a plurality of separation parts arrayed in a lattice-like fashion and in a second array pattern; the separation parts separating the stereoscopic vision image into the left-eye images and the right-eye images. At least one of the first array pattern and the second array pattern is a nonuniform array pattern that conforms to a curved surface of the windshield.

With the above configuration, a display device of the present disclosure is capable of suppressing crosstalk in naked eye stereoscopic vision.

DESCRIPTION OF EMBODIMENTS

Display devices for naked eye stereoscopic vision has been conventionally known. A display device for naked eye stereoscopic vision projects a mutually different left-eye image and right-eye image. When the display device for naked eye stereoscopic vision projects these left-eye image and right-eye image, there are cases where the right-eye image enters a user's left eye or the left-eye image enters a user's right eye. This incident is called crosstalk, which may be a cause of degrading the naked eye stereoscopic vision.

Figure 8:
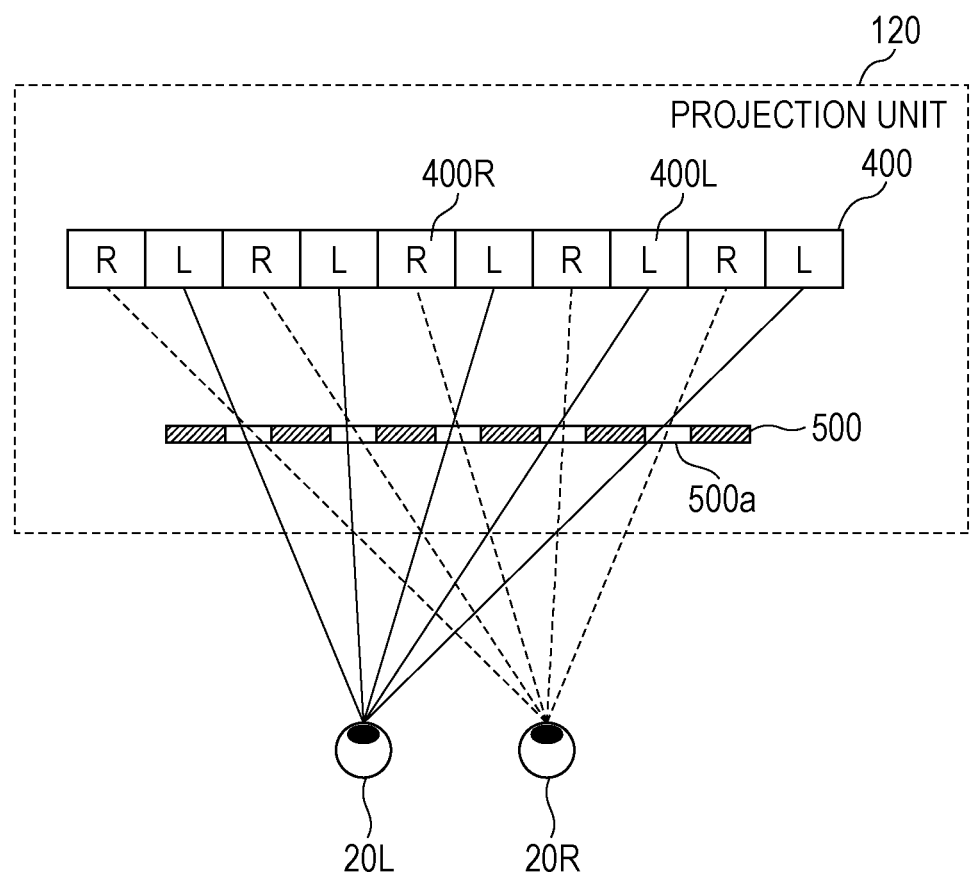
FIG. 8 is a schematic view illustrating a principle of naked eye stereoscopic vision employing a parallax barrier system.

A description will be given of a method for projecting a 3D image that is stereoscopically visible with the naked eyes of a user, with reference to FIG. 8 and FIG. 9. FIG. 8 is a schematic view (top plan view) illustrating a principle of naked eye stereoscopic vision employing a parallax barrier system. Projection unit 120 projects a 3D image and mainly includes video element 400 and parallax barrier 500.

Video element 400 is an element that projects a stereoscopic vision image in which a plurality of rectangular left-eye images and a plurality of rectangular right-eye images are alternately arrayed. Video element 400 may be made of a transmissive liquid crystal element used for a projector, for example.

Parallax barrier 500 is a parallax optical element in which separation parts are arrayed in a lattice-like fashion; the separation parts separating the stereoscopic vision image projected by video element 400 into the left-eye images and the right-eye images. Each separation part in parallax barrier 500 may be formed of a slit 500*a*.

Figure 9:
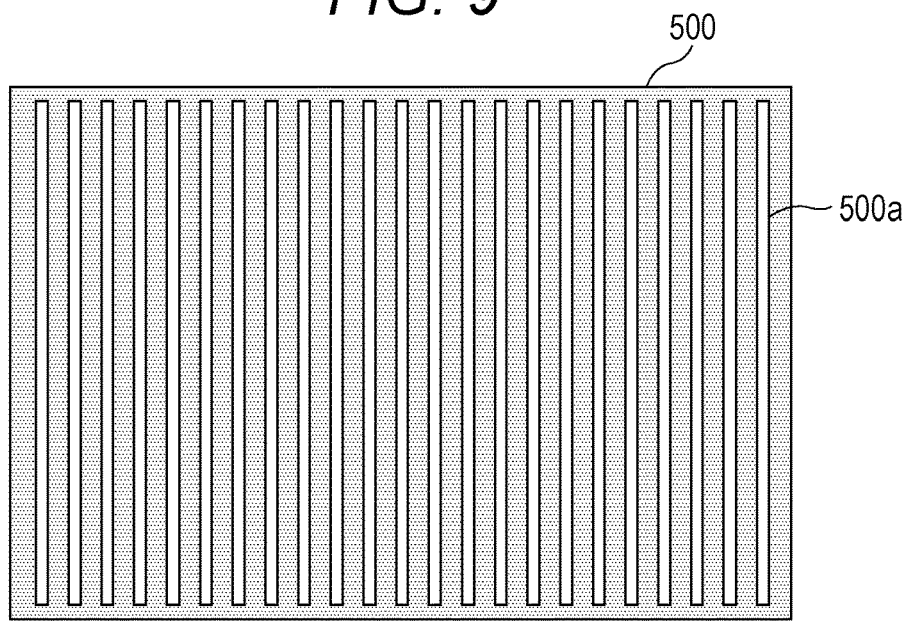
FIG. 9 is a schematic view illustrating an outline of the parallax barrier.

FIG. 9 is a schematic view (front view) illustrating an outline of parallax barrier 500. Parallax barrier 500 is provided with a plurality of slits 500*a* arrayed in a uniform array pattern. In conformity with the parallax barrier system, video element 400 in projection unit 120 is provided with a plurality of pixel arrays to which pixel arrays 400L for a left eye and pixel arrays 400R for a right eye are alternately assigned in a uniform array pattern.

As illustrated in FIG. 8, parallax barrier 500 is provided in front of video element 400 in projection unit 120 (or between video element 400 and the user).

When pixel arrays 400L for a left eye in video element 400 illustrated in FIG. 8 output rectangular left-eye images, these rectangular left-eye images pass through slits 500*a* formed in parallax barrier 500 and then enter user's left eye 20L (see the solid lines in FIG. 8). Likewise, when pixel arrays 400R for a right eye output rectangular right-eye images, these rectangular right-eye images pass through slits 500*a* and then enter user's right eye 20R (see the dotted lines in FIG. 8). In this case, the image (each left-eye image) viewed by the left eye of user 20 and the image (each right-eye image) viewed by the right eye of user 20 are mutually different images between which parallax is present. The parallax between the images allows the user to stereoscopically perceive these images.

In the above way, projection unit 120 can project a 3D image (rays forming a 3D image) that is stereoscopically visible with the naked eyes of a user.

It can be found that display devices for vehicles have a following problem. Specifically, projection unit 120 in a display device for a vehicle projects a 3D image onto the windshield (front glass) of the vehicle, and then the 3D image is reflected by the windshield and viewed by the user. In this case, if the windshield of the vehicle has a curved surface, the 3D image reflected by the windshield may fail to reach the user's eyes. Details of this problem will be described with reference to FIG. 10.

Figure 10:
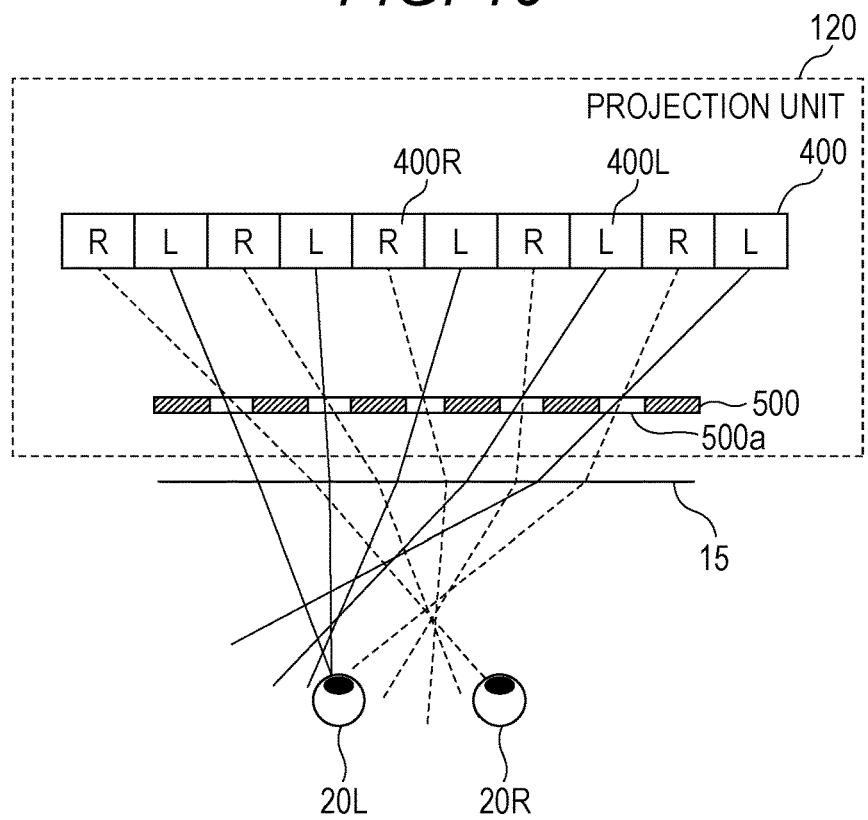
FIG. 10 is a schematic view illustrating an influence of a shape of a windshield in the naked eye stereoscopic vision employing the parallax barrier system.

FIG. 10 is a schematic view (top plan view) illustrating an influence of a shape of a windshield in the naked eye stereoscopic vision employing the parallax barrier system. In FIG. 10, windshield 15 is illustrated as a transmissive optical element that is optically equivalent to windshield 15. FIG. 10 illustrates an exemplary case where the driver's seat is installed on the right side of the vehicle and a 3D image is projected onto windshield 15 on the driver's seat side. In this case, windshield 15 is almost flat on the left side but curved gradually toward the right side. When the 3D image is projected onto windshield 15, a deflected angle of the 3D image depends on at which position the 3D image is projected onto windshield 15.

For the above reason, as illustrated in FIG. 10, a part of the left-eye image and right-eye image reflected by windshield 15 may fail to enter the user's eyes (left eye 20L and right eye 20R). Moreover, as illustrated in FIG. 10, an incident in which a part of the right-eye image enters left eye 20L, that is, crosstalk may occur.

Some exemplary embodiments will be given below in detail with reference to the accompanying drawings.

The exemplary embodiments that will be described below are comprehensive, specific examples. Numeric values, shapes, materials, constituent elements, their layouts and connections, process steps, and order of the process steps in the exemplary embodiments are examples and not intended to limit the present disclosure, accordingly. Of constituent elements in the following exemplary embodiments, ones that are not described in the independent claim specifying the highest conception may be regarded as options.

First Exemplary Embodiment

A display device according to a first exemplary embodiment will be described below with reference to FIG. 1 to FIG. 5.

1-1. Configuration of Display Device

Figure 1:
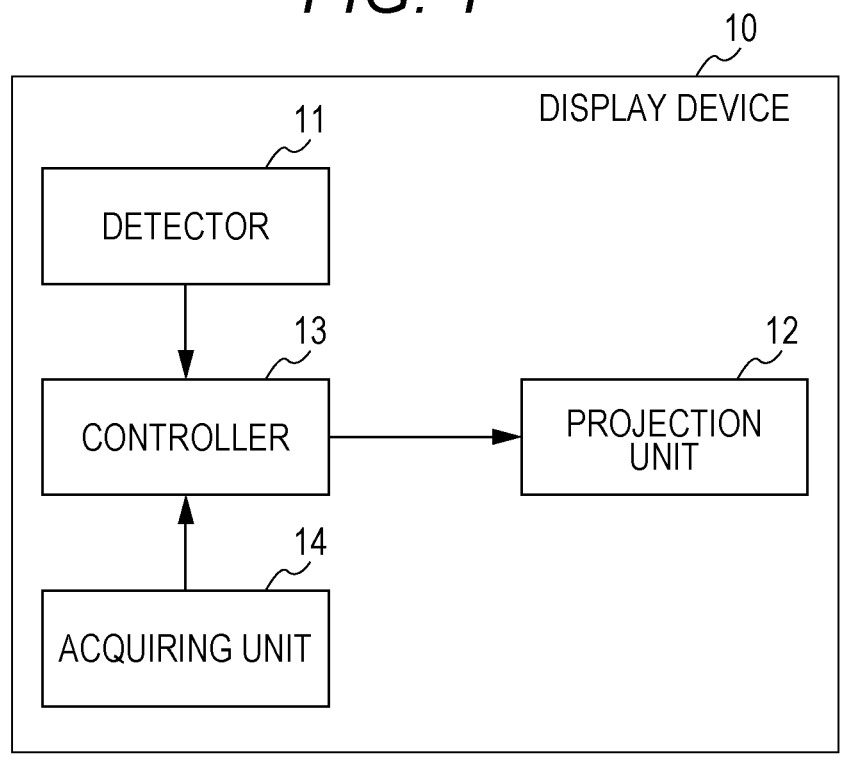
FIG. 1 is a block diagram illustrating a functional configuration of a display device according to a first exemplary embodiment.
Figure 2:
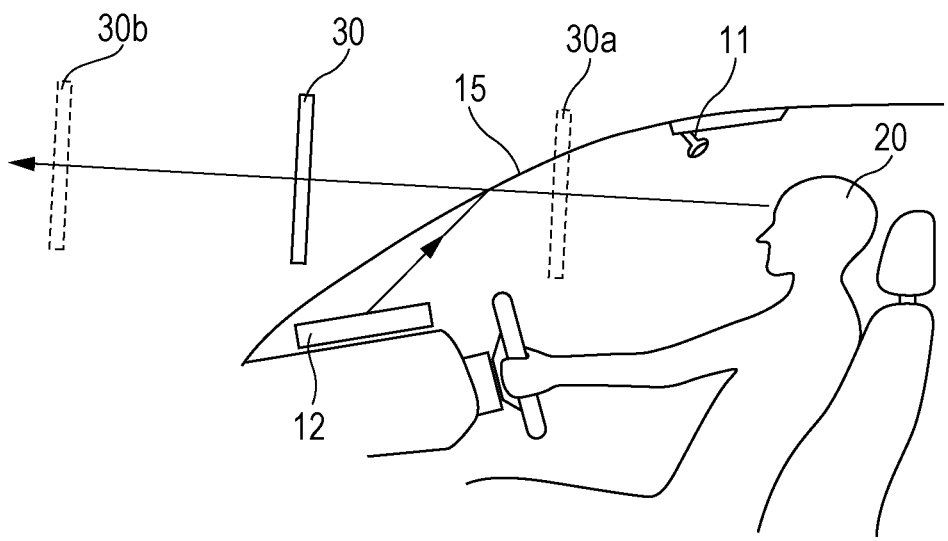
FIG. 2 is a schematic view of a configuration of the display device according to the first exemplary embodiment.

First, a configuration of a display device according to this exemplary embodiment will be described with reference to FIG. 1 and FIG. 2. FIG. 1 is a block diagram illustrating a functional configuration of the display device according to this exemplary embodiment. FIG. 2 is a schematic view of a configuration of the display device according to this exemplary embodiment.

As illustrated in FIG. 1, display device 10 includes detector 11, projection unit 12, controller 13, and acquiring unit 14. Display device 10 is a so-called head-up display and installed inside a vehicle, as illustrated in FIG. 2. Projection unit 12 in display device 10 projects an image onto windshield 15, and user 20 views the image reflected by windshield 15.

Detector 11 illustrated in FIG. 1 and FIG. 2 detects positions of both the eyes of user 20. More specifically, detector 11 includes, for example at least an image pickup unit (image pickup device) that captures an image of the face of user 20 and a processing unit that detects positions of both the eyes by using the captured image. In other words, detector 11 captures an image of the front face of user 20 and detects eye positions of user 20 by using the captured image. It should be noted that any given method, such as existing facial recognition technology, may be used to detect eye positions. Detector 11 may detect eye positions about 30 times to 60 times per second, for example.

Projection unit 12 illustrated in FIG. 1 and FIG. 2 is an image projection device that projects a 3D image that is stereoscopically visible with the naked eyes of user 20. In this exemplary embodiment, projection unit 12 may be a tablet-shaped image projection device and mounted on the dashboard of the vehicle, for example, as illustrated in FIG. 2.

Projection unit 12 projects light onto windshield 15, creating an image (virtual image) at position 30 by using the light reflected by windshield 15. Thus, when projection unit 12 projects a 3D image (rays forming a 3D image), the 3D image is displayed at position 30. In this case, an image (each left-eye image) viewed by the left eye of user 20 and an image (each right-eye image) viewed by the right eye of user 20 are mutually different images between which parallax is present. Therefore, objects contained in the 3D image are visually perceived at near position 30a, far position 30b, and the like in accordance with the parallaxes of the objects.

Projection unit 12 may project an image by means of, for example a liquid crystal on silicon (LCOS) system using a reflective liquid crystal and a light emitting diode (LED), a digital light processing (DLP (registered trademark)) using a micro mirror array and an LED, or a laser scanning system (raster scanning system) using a micro electro mechanical systems (MEMS) mirror and a semiconductor laser. A 3D image projected by projection unit 12 is an image that is stereoscopically visible with the naked eyes of a user, details of which will be described later.

Acquiring unit 14 illustrated in FIG. 1 obtains vehicle-related information from the vehicle. This vehicle-related information may be information on a vehicle speed, for example. Acquiring unit 14 may obtain the information from devices other than display device 10; examples of those devices include a smartphone and a car navigation system installed inside the vehicle. In addition, acquiring unit 14 may obtain the information via any given communication network, such as a wired or wireless communication network (or any given communication interface).

Controller 13 illustrated in FIG. 1 is a processing unit that adjusts a 3D image to be projected by projection unit 12 in accordance with the information obtained by acquiring unit 14 and the detection result from detector 11. For example, controller 13 causes projection unit 12 to project an image containing an arrow for navigation or an image containing a speed meter, based on the information obtained by acquiring unit 14.

Controller 13 may also be a processor, for example. Controller 13 may be implemented in either hardware only or a combination of hardware and software. As an example, controller 13 may be implemented using a microcontroller.

1-2. Configuration of Projection Unit

Next, a description will be given of projection unit 12 in display device 10 according to this exemplary embodiment. Similar to projection unit 120 described above with reference to FIGS. 8 to 10, projection unit 12 in display device 10 according to this exemplary embodiment which projects a 3D image employs the parallax barrier system to project a 3D image. However, projection unit 12 according to this exemplary embodiment differs from projection unit 120 described above, in an array pattern of the slits in the parallax barrier. Hereinafter, projection unit 12 according to this exemplary embodiment will be described with reference to FIG. 3 and FIG. 4.

Figure 3:
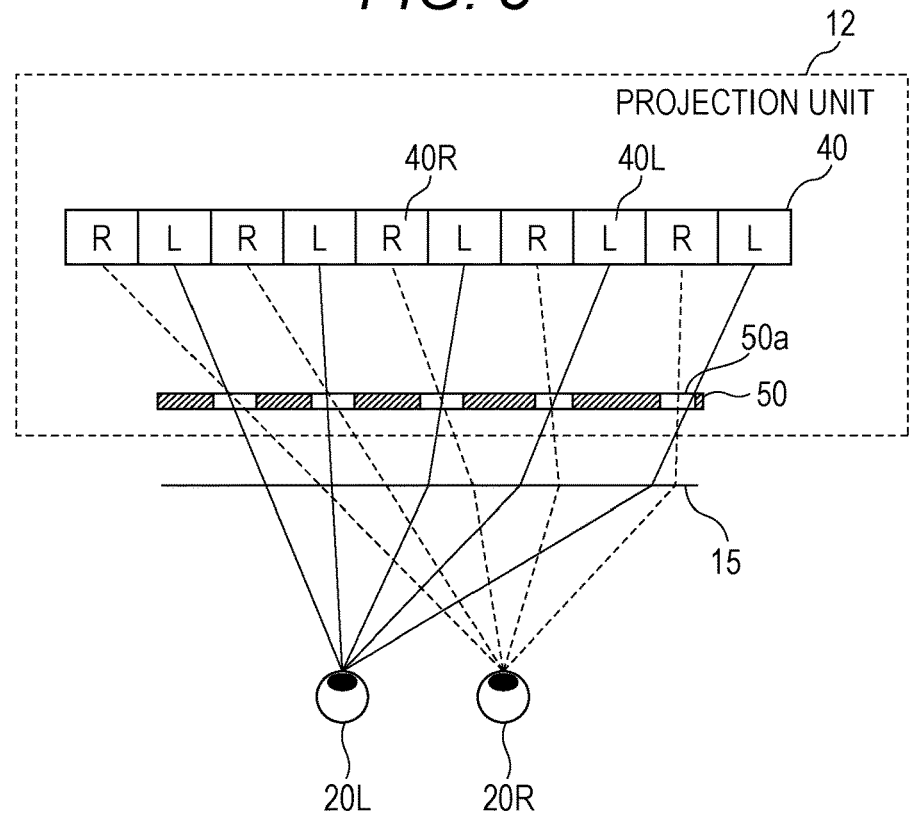
FIG. 3 is a schematic view illustrating the projection unit according to the first exemplary embodiment.

FIG. 3 is a schematic view (top plan view) illustrating projection unit 12 according to this exemplary embodiment. Projection unit 12 that projects a 3D image mainly includes video element 40 and parallax barrier 50. In FIG. 3, windshield 15 onto which projection unit 12 projects a 3D image is illustrated as a transmissive optical element that is optically equivalent to windshield 15.

Video element 40 illustrated in FIG. 3 is an element that projects, onto windshield 15, a stereoscopic vision image in which a plurality of rectangular left-eye images and a plurality of rectangular right-eye images are alternately arrayed. Video element 40 may be made of a transmissive liquid crystal element used for a projector, for example. Similar to video element 400 described above with reference to FIG. 8, video element 40 in this exemplary embodiment is provided with a plurality of pixel arrays to which pixel arrays 40L for a left eye and pixel arrays 40R for a right eye are alternately assigned, as illustrated in FIG. 3; pixel arrays 40L output left-eye images, and pixel arrays 40R output right-eye images.

Parallax barrier 50 illustrated in FIG. 3 is provided between video element 40 and windshield 15 and is a parallax optical element in which a plurality of separation parts are arrayed in a lattice-like fashion; the separation parts separating the stereoscopic vision image projected by video element 40 into the left-eye images and the right-eye images. In this exemplary embodiment, the separation parts may include a plurality of slits 50a. The above stereoscopic vision image projected by video element 40 is changed into a 3D image by parallax barrier 50.

Slits 50a in parallax barrier 50 in this exemplary embodiment are formed in a nonuniform array pattern so that an interval between slits is widened toward the right side in FIG. 3. This nonuniform array pattern is an array pattern that conforms to a curved surface of windshield 15 whose radius of curvature decreases toward the right side in FIG. 3. In other words, an interval between adjacent two slits 50a is widened in proportion to a decrease in radii of curvature of windshield 15 at positions that optically oppose the adjacent two slits 50a.

Arraying slits 50a in a nonuniform array pattern in the above manner helps to lessen an influence of windshield 15 by which an optical path of a 3D image is deflected. As a result, as illustrated in FIG. 3, the left-eye images enter left eye 20L, and the right-eye images enter right eye 20R. Parallax barrier 50 illustrated in FIG. 3 will be described in more detail with reference to FIG. 4.

Figure 4:
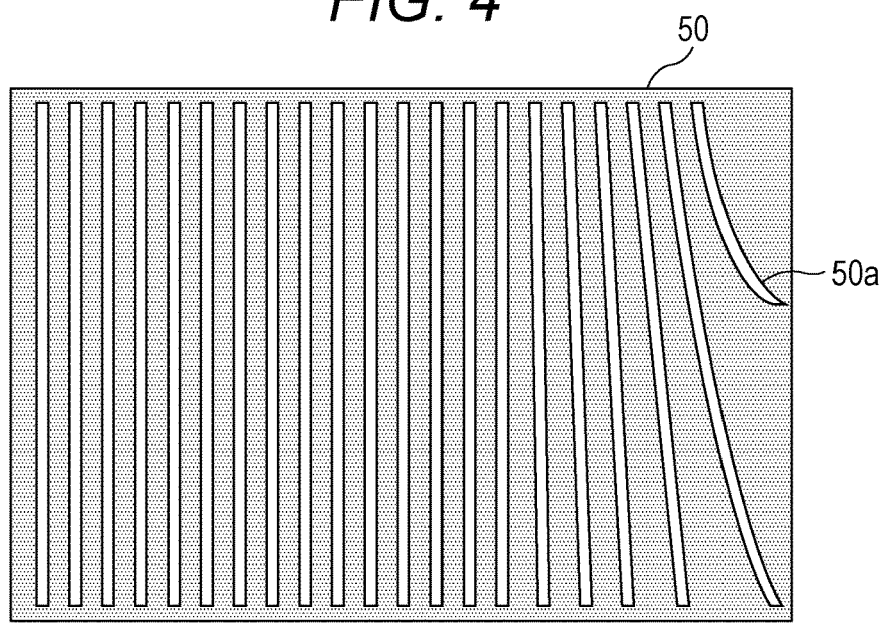
FIG. 4 is a schematic view illustrating an outline of an array pattern of slits in the parallax barrier.

FIG. 4 is a schematic view (front view) illustrating an outline of an array pattern of slits 50a in parallax barrier 50 illustrated in FIG. 3.

In the example illustrated in FIG. 4, the plurality of slits 50a in parallax barrier 50 are arranged in a nonuniform array pattern. More specifically, an interval between slits 50a is widened toward the lower right side in FIG. 4. In addition, a part of slits 50a is curved in the example illustrated in FIG. 4. This nonuniform array pattern is an array pattern that conforms to a curved surface of windshield 15 whose radius of curvature decreases toward the upper right side with respect to user 20 as illustrated in FIG. 2.

Parallax barrier 50 as illustrated in FIG. 4 helps to lessen an influence of windshield 15 on an optical path (see the solid lines and dotted lines in FIG. 3) of a 3D image (left-eye images and right-eye images), as illustrated in FIG. 3. In other words, parallax barrier 50 helps to reduce an occurrence of a crosstalk that may appear in the example illustrated in FIG. 10.

1-3. Displaying Method

Next, a description will be given of a method in which display device 10 according to this exemplary embodiment displays a 3D image, with reference to FIG. 5.

Figure 5:
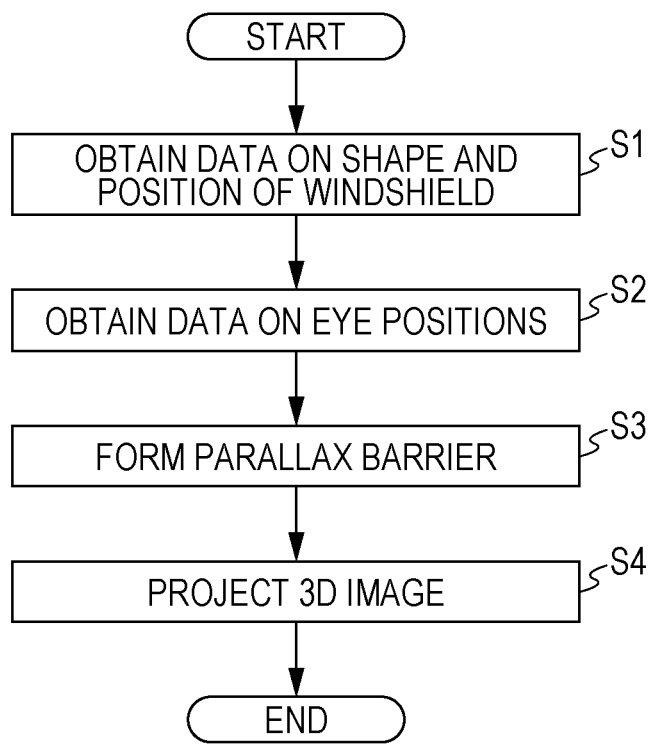
FIG. 5 is a flowchart of a process through which the display device according to the first exemplary embodiment displays a three dimensional (3D) image.

FIG. 5 is a flowchart of a process through which display device 10 according to this exemplary embodiment displays a 3D image.

First, acquiring unit 14 obtains data regarding a shape (e.g., radii of curvature at individual positions) of windshield 15 onto which a 3D image is to be projected by projection unit 12 of display device 10 and a position of windshield 15 relative to projection unit 12 (S1). With this data, an optical path of an image to be projected onto windshield 15 by projection unit 12 can be accurately calculated by using a ray tracing technique.

Next, acquiring unit 14 further obtains data regarding positions of both the eyes of user 20 (S2). In this case, positions of both the eyes in the data obtained may be either potential positions of both the eyes of user 20 or actual positions detected by detector 11 when user 20 sits on the vehicle seat. With this data, a target position of an optical path of a 3D image to be projected by projection unit 12 can be determined.

Then, the ray tracing is performed by using the data obtained in the above manner so that the left-eye images from video element 40 enter left eye 20L of user 20 and the right-eye images from video element 40 enter right eye 20R of user 20. With this, an array pattern of slits 50a in parallax barrier 50 is calculated. In this way, parallax barrier 50 with the calculated array pattern is formed (S3). In this case, parallax barrier 50 may be an optical element in which an array pattern of slits 50a is fixed or an optical element, such as a liquid crystal barrier, in which an array pattern of slits 50a is variable. If parallax barrier 50 with a variable array pattern is used, controller 13 may automatically adjust an array pattern of slits 50a, based on the data obtained. Furthermore, detector 11 may detect positions of both the eyes of user 20 at regular intervals, and in accordance with these detected eye positions, controller 13 may adjust an array pattern of slits 50a. In this case, if user 20 changes his/her attitude and thus both the eyes of user 20 are displaced, display device 10 still enables user 20 to view a good stereoscopic vision image with their naked eyes.

After parallax barrier 50 has been formed in the above manner, video element 40 projects a stereoscopic vision image onto parallax barrier 50, and this stereoscopic vision image is changed into a 3D image. Then, projection unit 12 projects this 3D image (S4). The 3D image is projected onto and reflected by windshield 15, and user 20 views the 3D image. This enables user 20 to view a stereoscopic vision image with their naked eyes.

Performing the foregoing displaying method in this exemplary embodiment can suppress crosstalk in naked eye stereoscopic vision.

Second Exemplary Embodiment

Next, a display device according to a second exemplary embodiment will be described. The display device according to the first exemplary embodiment has a parallax barrier in which slits are formed in a nonuniform array pattern, for the purpose of reducing crosstalk. However, a display device according to the second exemplary embodiment has a parallax barrier in which slits are formed in a uniform array pattern but the video element projects a stereoscopic vision image in a nonuniform array pattern, for the purpose of reducing crosstalk.

The display device in this exemplary embodiment includes the same constituent elements as in the foregoing first exemplary embodiment, aside from a parallax barrier and a video element in a projection unit. So, constituent elements other than the projection unit will not be described.

2-1. Configuration of Projection Unit

Figure 6:
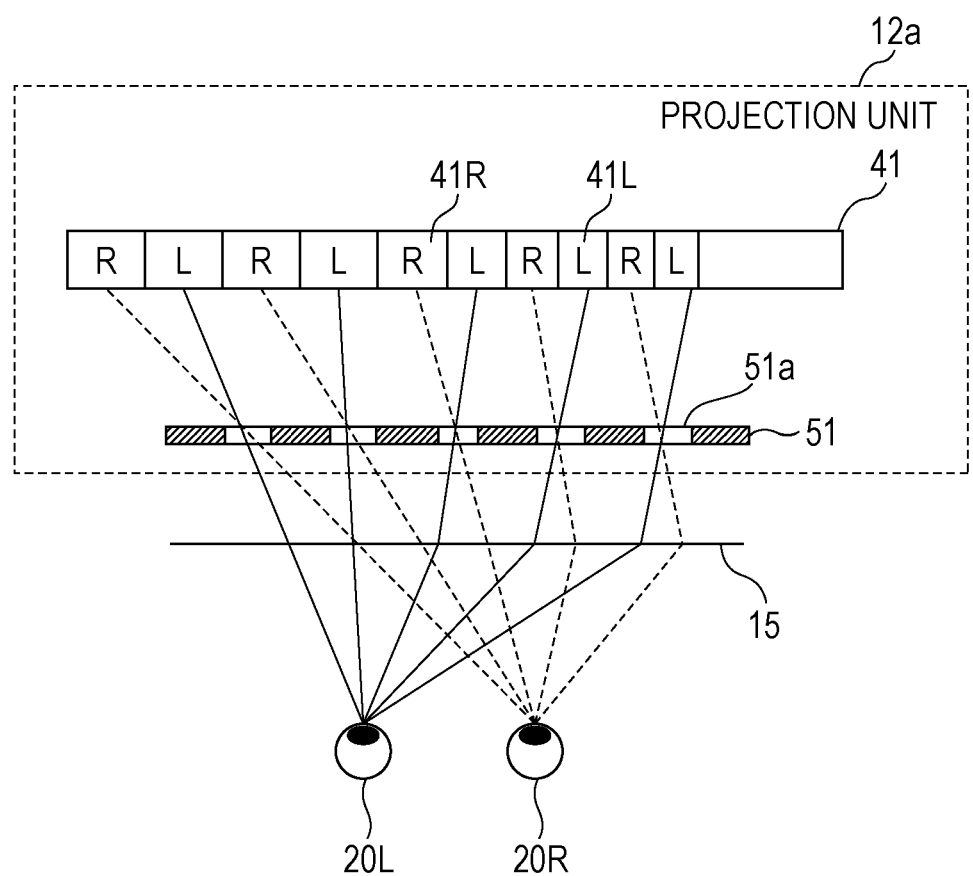
FIG. 6 is a schematic view illustrating a projection unit according to a second exemplary embodiment.

FIG. 6 is a schematic view (top plan view) illustrating a projection unit according to this exemplary embodiment. Projection unit 12a in this exemplary embodiment includes parallax barrier 51 and video element 41. Parallax barrier 51 is a parallax optical element in which slits 51a are formed in a uniform array pattern. Video element 41 projects a stereoscopic vision image in which a plurality of rectangular left-eye images and a plurality of rectangular right-eye images are arrayed in a nonuniform array pattern.

Video element 41 illustrated in FIG. 6 is provided with a plurality of pixel arrays to which pixel arrays 41L for a left eye and pixel arrays 41R for a right eye are alternately assigned with their width in an array direction (horizontal direction in FIG. 6) being nonuniform; pixel arrays 41L output left-eye images, and pixel arrays 41R output right-eye images. In FIG. 6, more specifically, intervals between the pixel arrays are set such that the left-eye images and the right-eye images are arrayed with their width in the array direction narrowed toward the right side of video element 41. In other words, intervals between the pixel arrays are set such that the left-eye images and the right-eye images are arrayed with their width in the array direction narrowed in proportion to a decrease in radii of curvature of windshield 15 at positions onto which the left-eye images and the right-eye images are projected. This configuration lessens an influence of windshield 15, having a curved surface whose radius of curvature decreases toward the right side, on the optical paths of the left-eye images and the right-eye images. Thus, the configuration can help to reduce crosstalk in the display device.

The left-eye images and the right-eye images in the stereoscopic vision image may be arrayed in a nonuniform array pattern so as to conform to the curved surface of windshield 15 whose radius of curvature decreases toward the upper right side with respect to user 20 illustrated in FIG. 2. In this case, at least one of the left-eye images and the right-eye images in the stereoscopic vision image might be curved.

In projection unit 12a, as described above, parallax barrier 51 is provided with a plurality of slits 51a formed in a uniform array pattern, and video element 41 projects a stereoscopic vision image in which left-eye images and right-eye images are arrayed in a nonuniform array pattern so as to conform to a curved surface of windshield 15. Using these constituent elements can help to reduce crosstalk.

2-2. Displaying Method

Figure 7:
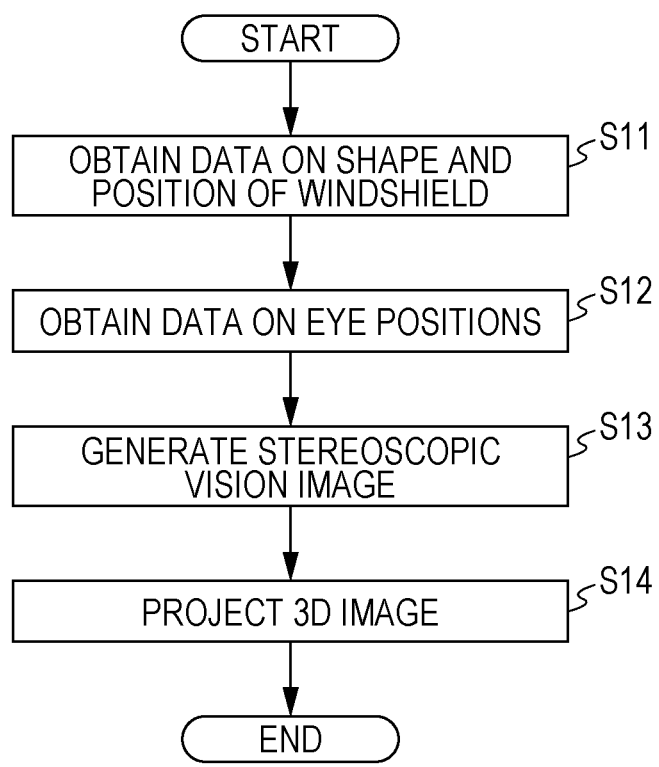
FIG. 7 is a flowchart of a process through which the display device according to the second exemplary embodiment displays a 3D image.

Next, a description will be given of a method in which the display device according to this exemplary embodiment displays a 3D image, with reference to FIG. 7. FIG. 7 is a flowchart of a process through which the display device according to this exemplary embodiment displays a 3D image.

Step S11 illustrated in FIG. 7 is substantially the same as step S1 described with reference to FIG. 5 in the first exemplary embodiment. Likewise, step S12 is substantially the same as step S2; step S14 is substantially the same as step S4. Therefore, steps S11, S12, and S14 will not be described and only step S13 will be described.

In step S13, a stereoscopic vision image made up of left-eye images and right-eye images is generated, based on data regarding a shape (e.g., radii of curvature at individual positions) and position of windshield 15 obtained in step S11 and data regarding positions of both the eyes of user 20 obtained in step S12. An array pattern for the stereoscopic vision image is calculated through the ray tracing technique so that the left-eye images in the stereoscopic vision image enter left eye 20L of user 20 and the right-eye images in the stereoscopic vision image enter right eye 20R of user 20. Based on the calculated array pattern, controller 13 causes video element 41 to generate the stereoscopic vision image. In this case, controller 13 may automatically adjust an array pattern of the left-eye images and the right-eye images in the stereoscopic vision image, based on the both eyes positions data obtained by detector 11. Furthermore, detector 11 may detect positions of both the eyes of user 20 at regular intervals, and controller 13 may adjust the array pattern so as to generate a stereoscopic vision image that conforms to the detected eye positions. In this case, if user 20 changes his/her attitude and thus both the eyes of user 20 are displaced, display device 10 still enables user 20 to view a good stereoscopic vision image with their naked eyes.

Other Exemplary Embodiments

The first exemplary embodiment and the second exemplary embodiment have been described as examples of the present disclosure. However, it can be appreciated that the present disclosure is not limited to the first and second exemplary embodiments and also applicable to exemplary embodiments that undergo modifications, substitutions, additions, and omissions as appropriate. Furthermore, it can also be appreciated that it is possible to conceive novel exemplary embodiments by combining some constituent elements described in the first and second exemplary embodiments.

For example, a parallax barrier is used as a parallax optical element in the foregoing first and second exemplary embodiments; however, another type of parallax optical element may be used. If a lenticular lens is used as another parallax optical element, for example, lenses in the lenticular lens which separate a stereoscopic vision image into left-eye images and right-eye images may be arrayed in a nonuniform array pattern.

In the foregoing examples, controller 13 calculates an array pattern in accordance with a view point position of a user. Alternatively, controller 13 may set an array pattern as a fixed pattern that conforms to a shape of a windshield and move this array pattern in parallel in response to movement of the view point position. This scheme is effective in decreasing computational complexity during an operation, a power consumption, heat generation, a cost of computing elements, that is, an overall system cost, and so on.

In the foregoing first and second exemplary embodiments, one of a parallax optical element and a stereoscopic vision image employs a nonuniform array pattern; however, both of a parallax optical element and a stereoscopic vision image may employ a nonuniform array pattern. In this case, it is possible to reduce the degree of nonuniformity of both array patterns.

A windshield used in the foregoing first and second exemplary embodiments has a curved surface whose radius of curvature decreases toward the right side with respect to a user; however, a curved shape of a windshield is not limiting. A display device that helps to reduce crosstalk is applicable to a windshield having an arbitrary curved shape.

For example, a display device is applicable to a windshield having a curved surface whose radius of curvature decreases toward the left side with respect to a user.

Display devices in the foregoing first and second exemplary embodiments may also be applied to any other transport apparatuses (e.g., airplanes and vessels) other than vehicles.

The constituent elements in the foregoing first and second exemplary embodiments may be implemented in dedicated hardware or by execution of a software program suitable for the constituent elements. Alternatively, the constituent elements may be implemented by reading and executing of a software program stored in a hard disk, semiconductor memory, or other recording medium with a unit for executing a program, such as a CPU or a processor.

A display device according to one or more aspects has been described based on the exemplary embodiments; however, it can be appreciated that the present disclosure is not limited to these exemplary embodiments. Various modifications of the exemplary embodiments that those skilled in the art can conceive of and some embodiments contemplated based on a combination of constituent elements in different exemplary embodiments may also be contained in the scope of one or more aspects, provided that these modifications and embodiments fall within the spirit of the present disclosure.

In the foregoing first and second exemplary embodiments, for example, a process that would be performed by a specific processing unit may be performed by another processing unit. A plurality of processes may be performed in a different order. Alternatively, a plurality of processes may be performed in parallel.

As described above, a display device according to an aspect of the present disclosure includes a video element and a parallax optical element. The video element projects, onto a windshield, a stereoscopic vision image in which a plurality of rectangular left-eye images and a plurality of rectangular right-eye images are alternately arrayed in a first array pattern. The parallax optical element is provided between the video element and the windshield and includes a plurality of separation parts arrayed in a lattice-like fashion and in a second array pattern; the separation parts separating the stereoscopic vision image into the left-eye images and the right-eye images. At least one of the first array pattern and the second array pattern is a nonuniform array pattern that conforms to a curved surface of the windshield.

A radius of curvature of the windshield may depend on at which position the stereoscopic vision image is projected onto the windshield.

An interval between adjacent two separation parts of the plurality of separation parts may be widened in proportion to a decrease in radii of curvature of the windshield at positions optically opposing the adjacent two separation parts.

A width of the left-eye images and the right-eye images in an array direction may be narrowed in proportion to a decrease in radii of curvature of the windshield at positions onto which the left-eye images and the right-eye images are projected.

At least one of the plurality of separation parts may be curved.

At least one of the left-eye images and the right-eye images may be curved.

Each of the separation parts may be a slit or a lens.

The display device further includes a detector that detects positions of a user's left eye and a user's right eye. At least one of the first array pattern and the second array pattern may be changed based on the positions detected by the detector.

An overall aspect or specific aspects of the above display device may be implemented using a system, a device, an integrated circuit (IC), a computer program, or a recording medium. Alternatively, the overall aspect or specific aspects may be implemented using an arbitrary combination of a system, a device, an integrated circuit (IC), a computer program, and a recording medium.

INDUSTRIAL APPLICABILITY

The present disclosure can be effectively used as a head-up display for a vehicle.

The invention claimed is:

1. A display device comprising:
   a video projector that projects, onto a windshield, a stereoscopic vision image in which a plurality of rectangular left-eye images and a plurality of rectangular right-eye images are alternately arrayed in a first array pattern; and
   a parallax optical element including a plurality of separation parts arrayed in a lattice-like fashion and in a second array pattern, the separation parts separating the stereoscopic vision image into the left-eye images and the right-eye images, the parallax optical element being provided between the video projector and the windshield,
   wherein:
   at least one of the first array pattern and the second array pattern is a nonuniform array pattern that conforms to a curved surface of the windshield; and
   a radius of curvature of the windshield depends on at which position the stereoscopic vision image is projected onto the windshield.

2. The display device according to claim 1, wherein an interval between adjacent two separation parts of the plurality of separation parts is widened in proportion to a decrease in radii of curvature of the windshield at positions optically opposing the adjacent two separation parts.

3. The display device according to claim 1, wherein a width of the left-eye images and the right-eye images in an array direction is narrowed in proportion to a decrease in radii of curvature of the windshield at positions onto which the left-eye images and the right-eye images are projected.

4. The display device according to claim 1, wherein at least one of the plurality of separation parts is curved.

5. The display device according to claim 1, wherein at least one of the left-eye images and the right-eye images is curved.

6. The display device according to claim 1, wherein each of the separation parts is a slit or a lens.

7. The display device according to claim 1, further comprising a detector that detects positions of a user's left eye and a user's right eye,
   wherein at least one of the first array pattern and the second array pattern is changed based on the positions detected by the detector.

* * * * *